US012432013B2

(12) United States Patent
Mehrotra

(10) Patent No.: US 12,432,013 B2
(45) Date of Patent: Sep. 30, 2025

(54) S1AP OPTIMAL RETRANSMISSION

(71) Applicant: Parallel Wireless, Inc., Nashua, NH (US)

(72) Inventor: Shivani Mehrotra, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 627 days.

(21) Appl. No.: 17/676,909

(22) Filed: Feb. 22, 2022

(65) Prior Publication Data

US 2022/0272600 A1 Aug. 25, 2022

Related U.S. Application Data

(60) Provisional application No. 63/151,435, filed on Feb. 19, 2021.

(51) Int. Cl.

| | |
|---|---|
| ***H04W 76/25*** | (2018.01) |
| ***H04L 1/08*** | (2006.01) |
| ***H04L 1/1867*** | (2023.01) |
| ***H04L 5/00*** | (2006.01) |
| ***H04W 36/02*** | (2009.01) |
| ***H04W 76/27*** | (2018.01) |
| ***H04W 76/30*** | (2018.01) |

(52) U.S. Cl.

CPC ................ *H04L 1/08* (2013.01); *H04L 1/188* (2013.01); *H04W 36/02* (2013.01); *H04W 76/30* (2018.02)

(58) Field of Classification Search

CPC ......... H04L 1/08; H04L 1/188; H04L 1/1887; H04W 36/02; H04W 76/30

See application file for complete search history.

(56) References Cited

U.S. PATENT DOCUMENTS

2019/0357295 A1* 11/2019 Kim ...................... H04W 76/25

OTHER PUBLICATIONS

LTE; General Packet Radio Service (GPRS) enhancements for Evolved Universal Terrestrial Radio Access Network (E-UTRAN) access (3GPP TS 23.401 version 12.6.0 Release 12), Sep. 2014.

Universal Mobile Telecommunications System (UMTS); LTE; 5G; Non-Access-Stratum (NAS) protocol for Evolved Packet System (EPS); Stage 3 (3GPP TS 24.301 version 15.4.0 Release 15), Oct. 2018.

LTE; Evolved Universal Terrestrial Radio Access Network (E-UTRAN); S1 Application Protocol (S1AP) (3GPP TS 36.413 version 15.3.0 Release 15), Sep. 2018.

* cited by examiner

*Primary Examiner* — Faruk Hamza
*Assistant Examiner* — Aixa A Guadalupe Cruz
(74) *Attorney, Agent, or Firm* — Michael Y. Saji

(57) ABSTRACT

Methods, systems and computer readable media are disclosed for operating a wireless network system. In one embodiment a method includes defining a plurality of Information Elements (IEs) relating to a retransmit timer value and a retransmit count; including, by the Mobility Management Entity (MME), the plurality of IEs in a first message sent to an eNodeB with a timer value and a retransmission count for the message; processing, by the eNodeB, the message, buffering the request, and starting a corresponding timer; and sending, by the eNodeB when a response from a User Equipment (UE) is not received before the timer expires, a stop retry message indication to the MME.

18 Claims, 7 Drawing Sheets

S1AP OPTIMAL RETRANSMISSION

CROSS-REFERENCE TO RELATED APPLICATIONS

This application claims priority under 35 U.S.C. § 119(e) to U.S. Provisional Pat. App. No. 63/151,435, filed Feb. 19, 2021, titled "S1AP Optimal Retransmission" which is hereby incorporated by reference in its entirety for all purposes. This application also hereby incorporates by reference, for all purposes, each of the following U.S. Patent Application Publications in their entirety: US-20170013513A1; US20170026845A1; US20170055186A1; US20170070436A1; US20170077979A1; US2017-0019375A1; US20170111482A1; US20170048710A1; US20170127409A1; US20170064621A1; US2017-0202006A1; US20170238278A1; US20170171828A1; US20170181119A1; US20170273134A1; US2017-0272330A1; US20170208560A1; US20170288813A1; US20170295510A1; US20170303163A1; and US2017-0257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

A Mobility Management Entity (MME) is a key control node, which deals with the Evolved Packet Core (EPC) control plane and is responsible for interaction with multiple peer nodes like Home Subscriber service (HSS), eNodeB, Serving GPRS Support Node (SGSN) and Serving Gateway (SGW) etc. Its role is to manage sessions, authentication, paging, mobility, bearers and roaming. It manages an eNB and an S-GW through the S1-MME and S11 interfaces respectively and communicates with HSS through the S6 interface. An SGW is directly controlled by an MME and is responsible for routing user plane packets between an eNB (S1-U) and a PGW (S5/S8 interface). It handles user handovers between neighboring eNBs.

SUMMARY

A system is disclosed to enhance LTE MME and eNodeB nodes in a manner which would optimize the retransmissions of S1AP encoded NAS messages being exchanged over S1-MME interface. This will help in reducing the significant network load and optimize the bandwidth on control plane. It will also improve the performance of the nodes by reducing the processing time required for encoding and decoding of these S1AP messages for S1-MME interface.

In one embodiment a method includes defining a plurality of Information Elements (IEs) relating to a retransmit timer value and a retransmit count; including, by the Mobility Management Entity (MME), the plurality of IEs in a first message sent to an eNodeB with a timer value and a retransmission count for the message; processing, by the eNodeB, the message, buffering the request, and starting a corresponding timer; and sending, by the eNodeB when a response from a User Equipment (UE) is not received before the timer expires, a stop retry message indication to the MME.

In another embodiment a system providing S1AP optimal retransmission includes a plurality of Information Elements (IEs) relating to a retransmit timer value and a retransmit count; an Mobility Management Entity (MME) including the plurality of IEs in a first message sent to an eNodeB with a timer value and a retransmission count for the message; wherein the eNodeB processes the message, buffers the request, and starts a corresponding timer; and wherein the eNodeB sends a stop retry message indication to the MME when a response from a User Equipment (UE) is not received before the timer expires.

In another embodiment a non-transitory computer-readable medium containing instructions for operating a wireless network system which, when executed, cause the system to perform steps including defining a plurality of Information Elements (IEs) relating to a retransmit timer value and a retransmit count; including, by the Mobility Management Entity (MME), the plurality of IEs in a first message sent to an eNodeB with a timer value and a retransmission count for the message; processing, by the eNodeB, the message, buffering the request, and starting a corresponding timer; and sending, by the eNodeB when a response from a User Equipment (UE) is not received before the timer expires, a stop retry message indication to the MME.

DETAILED DESCRIPTION

Figure 1:
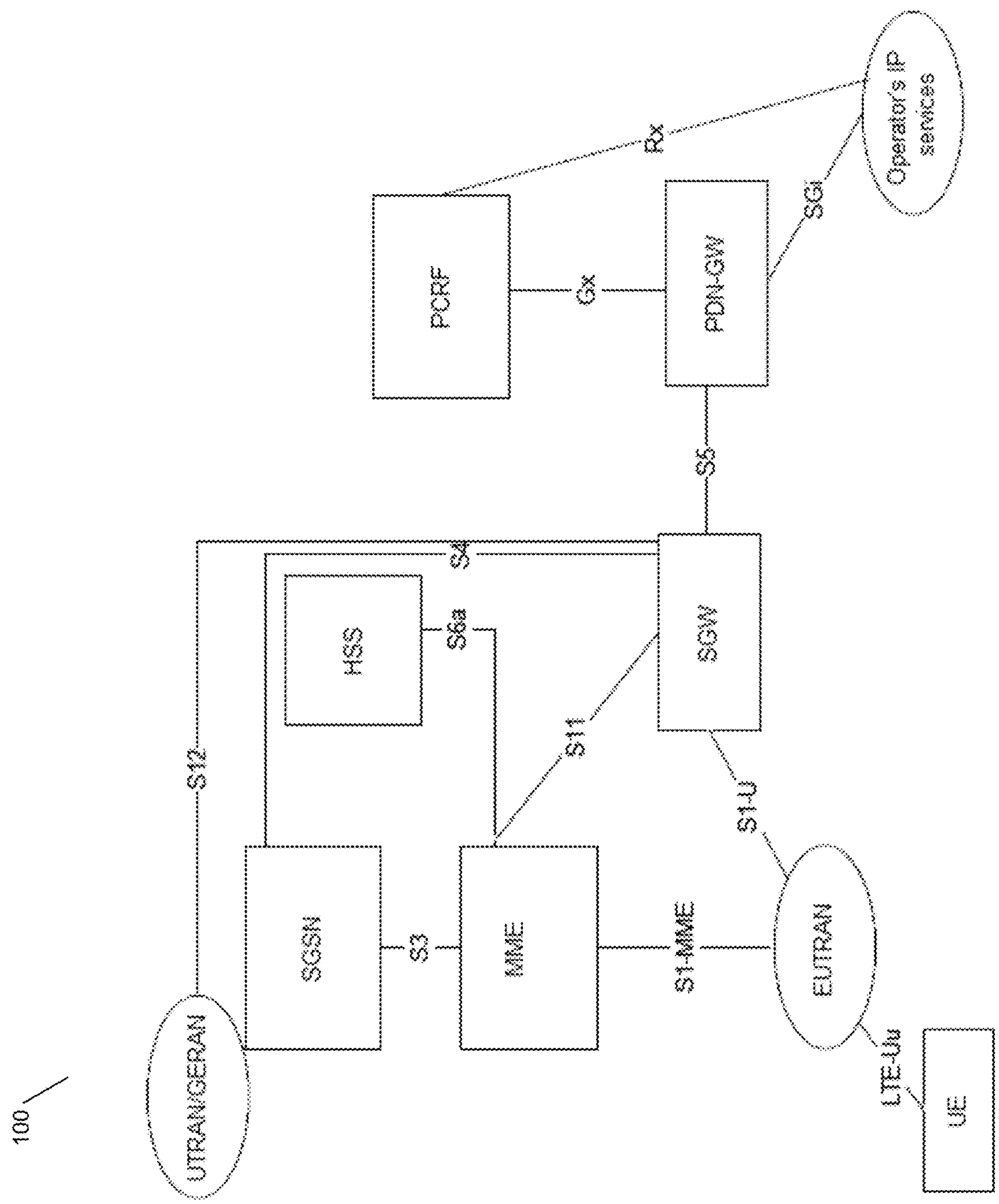
FIG. 1 is a diagram of an Evolved Packet Core architecture, in accordance with some embodiments.

While the present method and system for GTPC optimization is described relative to a 4G network, it should be appreciated that the same concepts apply to 5G networks as well. FIG. 1 shows an Evolved Packet Core (EPC) architecture 100 as defined by 3GPP 23.401.

MME is a key control node, which deals with the EPC control plane and is responsible for interaction with multiple peer nodes like HSS, eNodeB, SGSN and SGW etc. Its role is to manage sessions, authentication, paging, mobility, bearers and roaming. It manages an eNB and an S-GW through the S1-MME and S11 interfaces respectively and communicates with HSS through the S6 interface.

The S1 interface supports a multi-point connection among MMEs/S-GWs and eNBs. It connects the eNB to the EPC. It can be split into control-plane (S1-MME) and user-plane (S1-U). The S1-MME is a signaling interface which supports a set of functions and procedures between the eNB and the MME. All S1-MME signaling procedures belong to four main groups:

Bearer-level procedures, corresponding to all procedures related to bearer setup, modification and release, which are typically used during the establishment or the release of a session.

Handover procedures, which encompass all S1 functions related to user mobility between eNB or with 2G/3G technologies.

NAS signaling transport, corresponding to the transport of UE-MME NAS signaling over the S1 interface.

Paging procedure, which is used in case of a mobile-terminated call/session. Through the paging procedure, the MME requests the eNB to page a UE in a given set of cells known as a tracking area.

Figure 2:
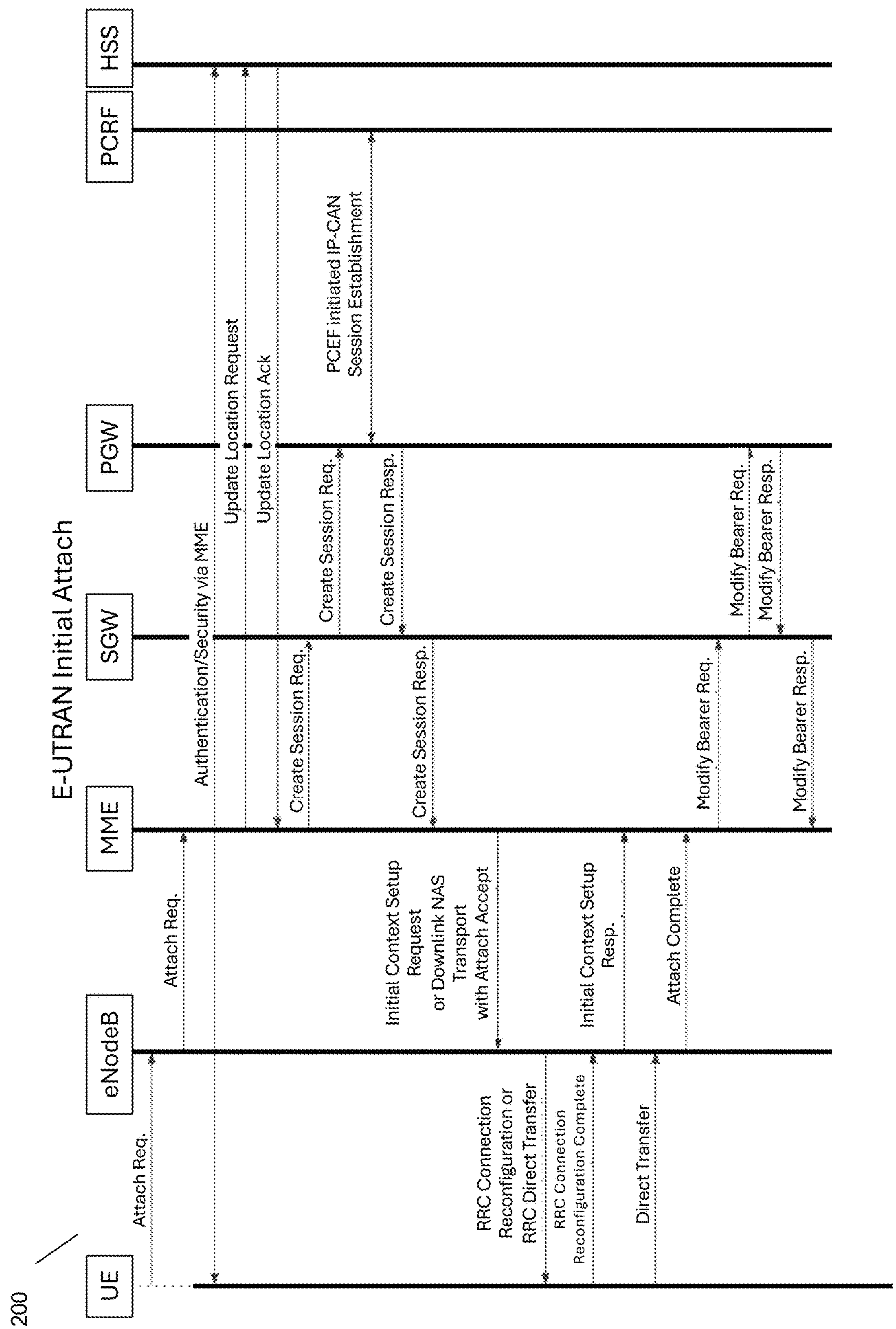
FIG. 2 is a call flow diagram for E-UTRAN Initial Attach, in accordance with some embodiments.

FIG. 2 shows a call flow 200 for E-UTRAN Initial Attach is given below:

Currently, significant control messaging takes place between MME and eNodeB nodes over S1-MME interfaces to support various Mobility Management and Session Management operations. To ensure delivery of messages from MME to UE, many retransmissions are done by MME if response of a message is not received timely from UE. Retransmission of these messages is managed by the NAS-timers defined in 3GPP 23.401. List of these timers is given below:

| TIMER NUM. | TIMER VALUE | STATE | CAUSE OF START | NORMAL STOP | ON THE 1st, 2nd, 3rd, 4th EXPIRY (NOTE 1) |
|---|---|---|---|---|---|
| T3413 NOTE 8 NOTE 10 | NOTE 2 | EMM-REGISTERED | Paging procedure for EPS services initiated | Paging procedure for EPS services completed Paging procedure is aborted | Network dependent |
| T3415 NOTE 8 NOTE 10 | NOTE 6 | EMM-REGISTERED | Paging procedure for EPS services initiated for a UE which the network accepted the request to use eDRX and the UE does not have a PDN connection for emergency bearer services | Paging procedure for EPS services completed Paging procedure is aborted | Paging procedure is aborted, and the network proceeds as specified in 3GPP TS 23.401 [10] |
| T3422 NOTE 7 NOTE 9 | 6 s In WB-S1/CE mode, 24 s | EMM-DEREGISTERED-INITIATED | DETACH REQUEST sent | DETACH ACCEPT received | Retransmission of DETACH REQUEST |
| T3447 | NOTE 2 | All | UE transitions from EMM-CONNECTED mode to EMM-IDLE mode except when UE was in EMM-CONNECTED mode due to paging, attach without PDN connection or tracking area update request without “active” or “signalling active” flag set UE transitions from 5GMM-CONNECTED mode to 5GMM-IDLE mode except when UE was in 5GMM-CONNECTED mode due to paging, REGISTRATION REQUEST for initial registration with Follow-on request indicator set to “No follow-on request pending”, or REGISTRATION REQUEST for mobility and periodic registration update with Follow-on request indicator set to “No follow-on request pending” and without Uplink data status IE included. | ATTACH ACCEPT or TRACKING AREA UPDATE ACCEPT without the T3447 value IE. At MME during inter-system change from S1 mode to N1 mode. REGISTRATION ACCEPT without the T3447 value IE (defined in 3GPP TS 24.501 [54]). CONFIGURATION UPDATE COMMAND with the T3447 value IE set to zero or deactivated (defined in 3GPP TS 24.501 [54]). At AMF during inter-system change from N1 mode to S1 mode defined in 3GPP TS 24.501 [54]). | Allow the UE to initiate a connection for transfer of uplink user data. |

-continued

| TIMER NUM. | TIMER VALUE | STATE | CAUSE OF START | NORMAL STOP | ON THE 1st, 2nd, 3rd, 4th EXPIRY (NOTE 1) |
|---|---|---|---|---|---|
| T3450 NOTE 7 NOTE 9 | 6 s In WB-S1/CE mode, 18 s | EMM-COMMON-PROC-INIT | ATTACH ACCEPT sent TRACKING AREA UPDATE ACCEPT sent with GUTI TRACKING AREA UPDATE ACCEPT sent with TMSI GUTI REALLOCATION COMMAND sent | ATTACH COMPLETE received TRACKING AREA UPDATE COMPLETE received GUTI REALLOCATION COMPLETE received | Retransmission of the same message type, i.e. ATTACH ACCEPT, TRACKING AREA UPDATE ACCEPT or GUTI REALLOCATION COMMAND |
| T3460 NOTE 7 NOTE 9 | 6 s in WB-S1/CE mode, 24 s | EMM-COMMON-PROC-INIT | AUTHENTICATION REQUEST sent SECURITY MODE COMMAND sent | AUTHENTICATION RESPONSE received AUTHENTICATION FAILURE received SECURITY MODE COMPLETE received SECURITY MODE REJECT received | Retransmission of the same message type, i.e. AUTHENTICATION REQUEST or SECURITY MODE COMMAND |
| T3470 NOTE 7 NOTE 9 | 6 s In WB-S1 mode, 24 s | EMM-COMMON-PROC-INIT | IDENTITY REQUEST sent | IDENTITY RESPONSE received | Retransmission of IDENTITY REQUEST |
| Mobile reachable | NOTE 4 | All except EMM-DEREGISTERED | Entering EMM-IDLE mode | NAS signalling connection established | Network dependent, but typically paging is halted on 1st expiry if the UE is not attached for emergency bearer services. Implicitly detach the UE which is attached for emergency bearer services. |
| Implicit detach timer | NOTE 3 | All except EMM-DEREGISTERED | The mobile reachable timer expires while the network is in EMM-IDLE mode | NAS signalling connection established | Implicitly detach the UE on 1st expiry |
| active timer | NOTE 5 | All except EMM-DEREGISTERED | Entering EMM-IDLE mode | NAS signalling connection established | Network dependent, but typically paging is halted on 1st expiry |

NOTE 1:
Typically, the procedures are aborted on the fifth expiry of the relevant timer. Exceptions are described in the corresponding procedure description.
NOTE 2:
The value of this timer is network dependent.
NOTE 3:
The value of this timer is network dependent. If ISR is activated, the default value of this timer is 4 minutes greater than T3423.
NOTE 4:
The default value of this timer is 4 minutes greater than T3412. If T3346 is larger than T3412 and the MME includes timer T3346 in the TRACKING AREA UPDATE REJECT message or SERVICE REJECT message, the value of the mobile reachable timer and implicit detach timer is set such that the sum of the timer values is greater than T3346. If the UE is attached for emergency bearer services, the value of this timer is set equal to T3412.
NOTE 5:
If the MME includes timer T3324 in the ATTACH ACCEPT message or TRACKING AREA UPDATE ACCEPT message and if the UE is not attached for emergency bearer services and has no PDN connection for emergency bearer services, the value of this timer is equal to the value of timer T3324.
NOTE 6:
The value of this timer is smaller than the value of timer T3-RESPONSE (see 3GPP TS 29.274 [16D]).
NOTE 7:
In NB-S1 mode, then the timer value shall be calculated as described in subclause 4.7.
NOTE 8:
In NB-S1 mode, then the timer value shall be calculated by using an NAS timer value which is network dependent.
NOTE 9:
In WB-S1 mode, if the UE supports CE mode B and operates in either CE mode A or CE mode B, then the timer value is as described in this table for the case of WB-S1/CE mode (see subclause 4.8).
NOTE 10:
In WB-S1 mode, if the UE supports CE mode B, then the timer value shall be calculated by using an NAS timer value which value is network dependent.

EPS Session Management Timers:

| TIMER NUM. | TIMER VALUE | STATE | CAUSE OF START | NORMAL STOP | ON THE 1st, 2nd, 3rd, 4th EXPIRY (NOTE 1) |
|---|---|---|---|---|---|
| T3485 NOTE 2 NOTE 3 | 8 s In WB-S1/CE mode, 16 s | BEARER CONTEXT ACTIVE PENDING | ACTIVATE DEFAULT EPS BEARER CONTEXT REQUEST sent ACTIVATE DEDICATED EPS BEARER CONTEXT REQUEST sent | ACTIVATE DEFAULT EPS BEARER CONTEXT ACCEPT received or ACTIVATE DEFAULT EPS BEARER CONTEXT REJECT received or ACTIVATE DEDICATED EPS BEARER CONTEXT ACCEPT received or ACTIVATE DEDICATED EPS BEARER CONTEXT REJECT received | Retransmission of the same message |
| T3486 NOTE 2 NOTE 3 | 8 s In WB-S1/CE mode, 16 s | BEARER CONTEXT MODIFY PENDING | MODIFY EPS BEARER CONTEXT REQUEST sent | MODIFY EPS BEARER CONTEXT ACCEPT received or MODIFY EPS BEARER CONTEXT REJECT received | Retransmission of MODIFY EPS BEARER CONTEXT REQUEST |
| T3489 NOTE 2 NOTE 3 | 4 s In WB-S1/CE mode, 12 s | PROCEDURE TRANSACTION PENDING | ESM INFORMATION REQUEST sent | ESM INFORMATION RESPONSE received | Retransmission of ESM INFORMATION REQUEST on 1st and 2nd expiry only |
| T3495 NOTE 2 NOTE 3 | 8 s In WB-S1/CE mode, 16 s | BEARER CONTEXT INACTIVE PENDING | DEACTIVATE EPS BEARER CONTEXT REQUEST sent | DEACTIVATE EPS BEARER CONTEXT ACCEPT received | Retransmission of DEACTIVATE EPS BEARER CONTEXT REQUEST |

NOTE 1:
Typically, the procedures are aborted on the fifth expiry of the relevant timer. Exceptions are described in the corresponding procedure description.
NOTE 2:
In NB-S1 mode, then the timer value shall be calculated as described in subclause 4.7.
NOTE 3:
In WB-S1 mode, if the UE supports CE mode B and operates in either CE mode A or CE mode B, then the timer value is as described in this table for the case of WB-S1/CE mode (see subclause 4.8).

Figure 3:
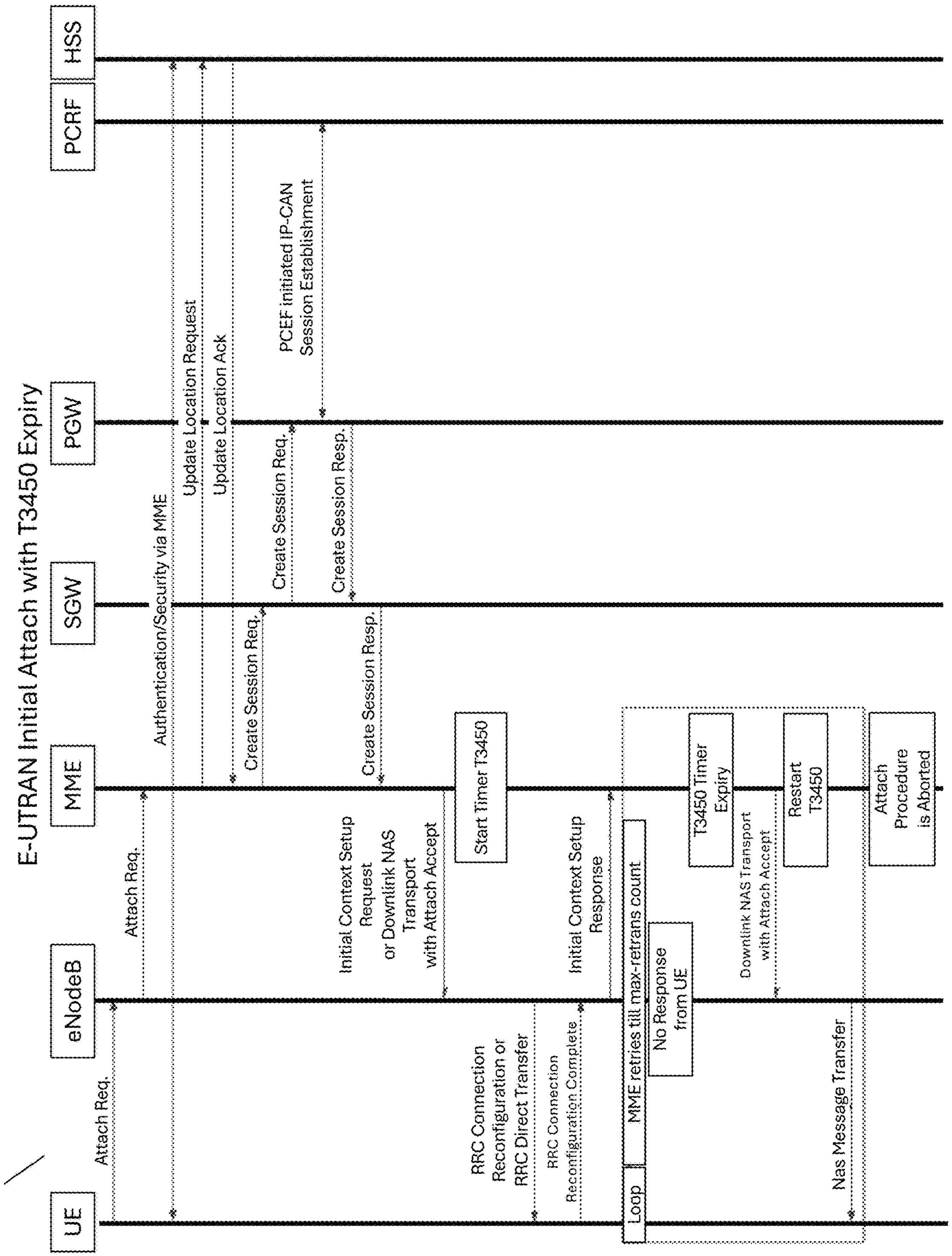
FIG. 3 is a call flow diagram for E-UTRAN Initial Attach with T3450 expiry, in accordance with some embodiments.

FIG. 3 shows one example 300 of the retransmissions with Timer T3450 is explained.

In the scenarios where response is not received timely from UE, there is significant messaging happening in the form of retransmissions over S1-MME interface.

For the virtualized product like Het-Net-Gateway (HNG) of Parallel Wireless, which supports both eNB and MME, this messaging can be optimized.

The idea presented in this document defines an approach to optimize the control plane signaling over S1-MME interface by enabling the eNodeB node to retransmit the messages if response is not received from UE.

Following new IEs shall be defined:

ID id-RETRANS-TIMER-VALUE CRITICALITY ignore Type Integer PRESENCE optional

ID id-RETRANS-COUNT CRITICALITY ignore Type Integer PRESENCE optional

These IEs shall be included by MME in the first message being sent to eNodeB with the retransmission count and timer value for this message.

Once eNodeB application processes the message successfully, it shall buffer the request and start the corresponding timer T.

If response from UE is not received till (T−1) secs, eNodeB shall send STOP-NAS-RETRY indication to MME.

The format of the indication is explained below.

STOP NAS RETRY INDICATION

This message is sent by the eNB and is used to indicate MME to stop delivery the retry of a NAS PDU previously sent over the S1 interface.

Direction: eNB→MME

| IE/Group Name, | Presence | IE type | Criticality Assigned | Criticality |
|---|---|---|---|---|
| Message Type | M | 9.2.1.1 | YES | ignore |
| MME UE S1AP ID | M | 9.2.3.3 | YES | reject |
| eNB UE S1AP ID | M | 9.2.3.4 | YES | reject |
| NAS-PDU | M | 9.2.3.5 | YES | ignore |

IE type in the above table refers to corresponding Sections as defined in 3GPP 36.413.

This indication informs MME that message has been buffered successfully at eNodeB and MME need not retransmit the message.

On receiving STOP-NAS-RETRY indication, MME assumes that retry of NAS messages will be taken care by eNodeB and stops the retransmissions.

On expiry of timer, it shall start a timer with value (Tx*RetransCount)).

If response from UE is not received till this timer expiry, MME takes the corresponding action as defined by the specification.

This approach will save on significant L5, L4, L3 and L2 processing for the S1AP messages required to be sent/received on S1MME interface thus eliminating most part of the stack processing for those messages. It will also decrease load on the MME which is the most critical and loaded node thus increasing the overall system performance.

If eNodeB does not support this feature, it shall drop the new IEs sent by MME.

If MME does not receive STOP-NAS-RETRY indication, it will continue functioning in the old manner and will retransmit the NAS messages.

Figure 4:
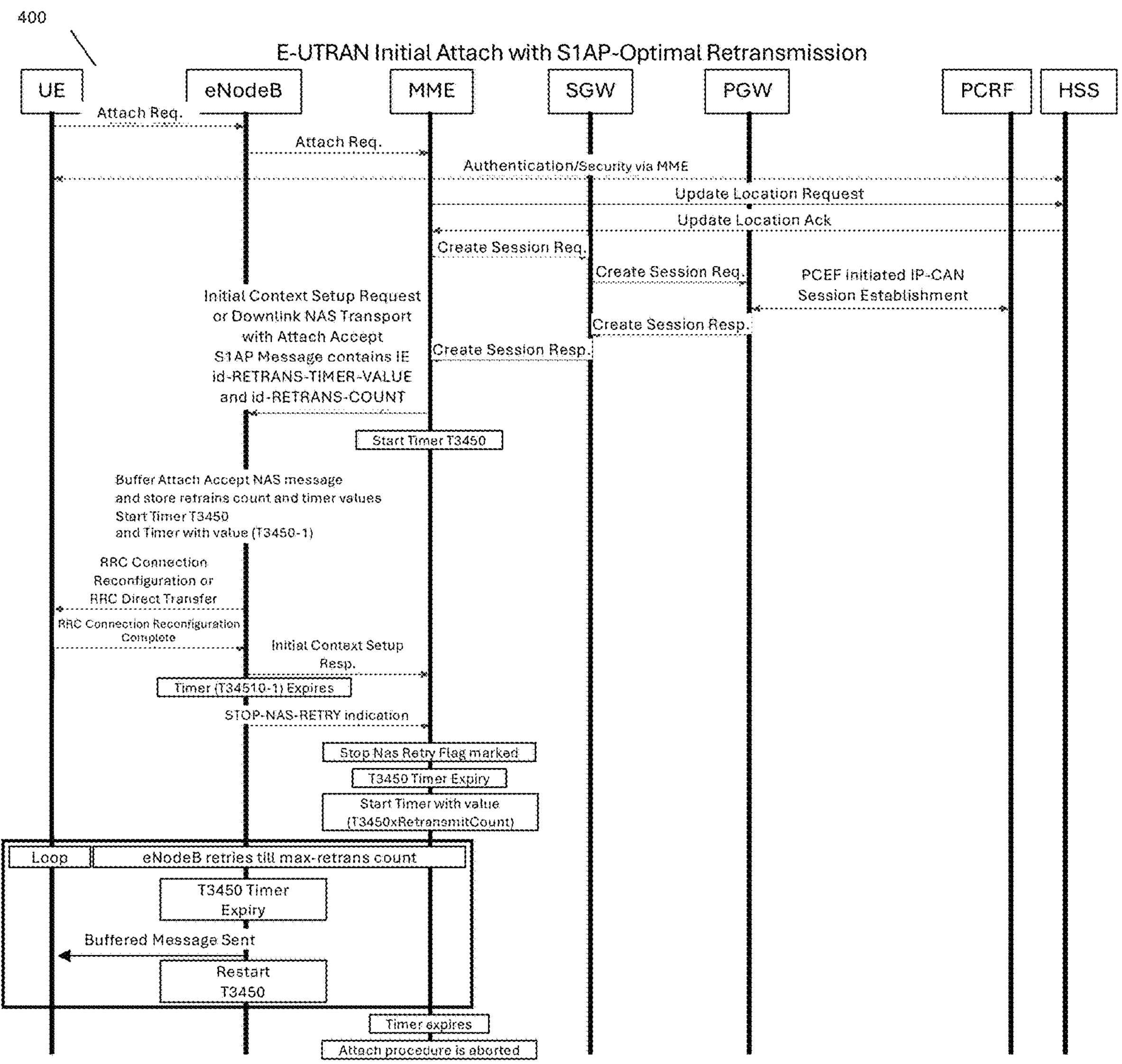
FIG. 4 is a call flow diagram for E-UTRAN Initial Attach with S!AP-Optimal retransmission, in accordance with some embodiments.

FIG. 4 shows an E UTRAN initial attach with S1AP-Optimal Retransmission 400.

It saves on major part of stack processing compared to the S1AP messages being retransmitted over S1-MME interface in case any response is not received from UE.

This approach uses the flexibility of the proprietary solutions supporting both eNodeB and MME nodes to device a solution to minimize the control traffic over S1-MME interface.

This feature empowers the solution to give better performance and make optimal use of network resources in the scenarios where retransmissions of NAS messages may be required.

Two new IEs id-RETRANS-TIMER-VALUE and id-RETRANS-COUNT are added to the existing S1AP messages carrying the NAS message which might need to be retransmitted.

A new S1AP indication STOP-NAS-RETRY Indication is also added to indicate MME about stopping the retransmissions.

The presently described methods and systems used to enhance LTE MME and eNodeB nodes in a manner which would optimize the retransmissions of S1AP encoded NAS messages being exchanged over S1-MME interface can be used for 5G, either for 5G standalone, 5G non-standalone, or 4G in conjunction with 5G in a virtualized RAN configuration. In some embodiments, the presently described methods and systems can be used in a 4G portion of a mixed 4G/5G network. In some embodiments, the presently described methods and systems can be used directly in a 5G NSA network, which uses the S1AP protocol in a NSA configuration. In some embodiments, the presently described methods and systems can be used in a 5G SA or 5GC network by enhancing the NGAP protocol between the 5G gNB and the 5G AMF in the 5G core network with equivalent retransmit counters and retransmit timers as described herein. These methods and systems may be deployed with core network support in a virtualized architecture.

5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G is a term loosely connected to a current generation of a radio access network and core network, and includes both a 5G radio access network (RAN) and a 5G core network. The 5G RAN is designed to interoperate together with the 4G (Long Term Evolution or LTE) RAN and core network. The 5G core network is also designed to interoperate with the 4G core network. Deployment of the 5G RAN in conjunction with the 4G core network is known as "non-standalone" or NSA. Deployment of the 5G RAN with the 5G core network and without the 4G core network is known as "standalone" or SA. Various combinations of 5G, including standalone and non-standalone and with other radio access networks, are contemplated by the 3rd Generation Partnership Project (3GPP).

Noteworthy is that the 5G RAN contemplates the use of millimeter waves to provide additional bandwidth. Millimeter waves tend to have shorter range than microwaves, such that the cells are limited to smaller size. Millimeter wave antennas are smaller than the large antennas used in previous cellular networks. They are only a few inches (several centimeters) long.

As discussed above, 5G is expected to operate in two modes as non-standalone and standalone mode of operation. For non-standalone operation, the specification defined the extension for S1 and X2 interfaces. For standalone operation new interfaces are defined. These new interfaces for 5G standalone operation may include an interface between RAN Node as X2/Xn; an interface between RAN and Core Network as S1/NG; an interface for Function Split and Open Interface as F1/E1 within RAN Node; and an interface between PHY and Radio as eCPRI.

The NG Application Protocol (NGAP) provides the control plane signalling between NG-RAN node and the Access and Mobility Management Function (AMF). The services provided by the NGAP are divided to UE associated and non UE associated. The UE associated services are related to one UE and the non UE associated services are related to the NG interface. The NGAP is transfered over SCTP. The NGAP protocol is defined in TS 38.413. The NGAP protocol provides transport function between UE and AMF by offering NAS signalling transport. The NAS protocol provides mobility management and session management between the User equipment (UE) and Access and Mobility Management Function (AMF). The NAS protocol is defined in TS 24.501. The NGAP/NAS Server Test Suite has been designed to act as a malicious gNodeB and UE that sends exceptional requests to the tested entity. The supported test target is AMF.

Figure 5:
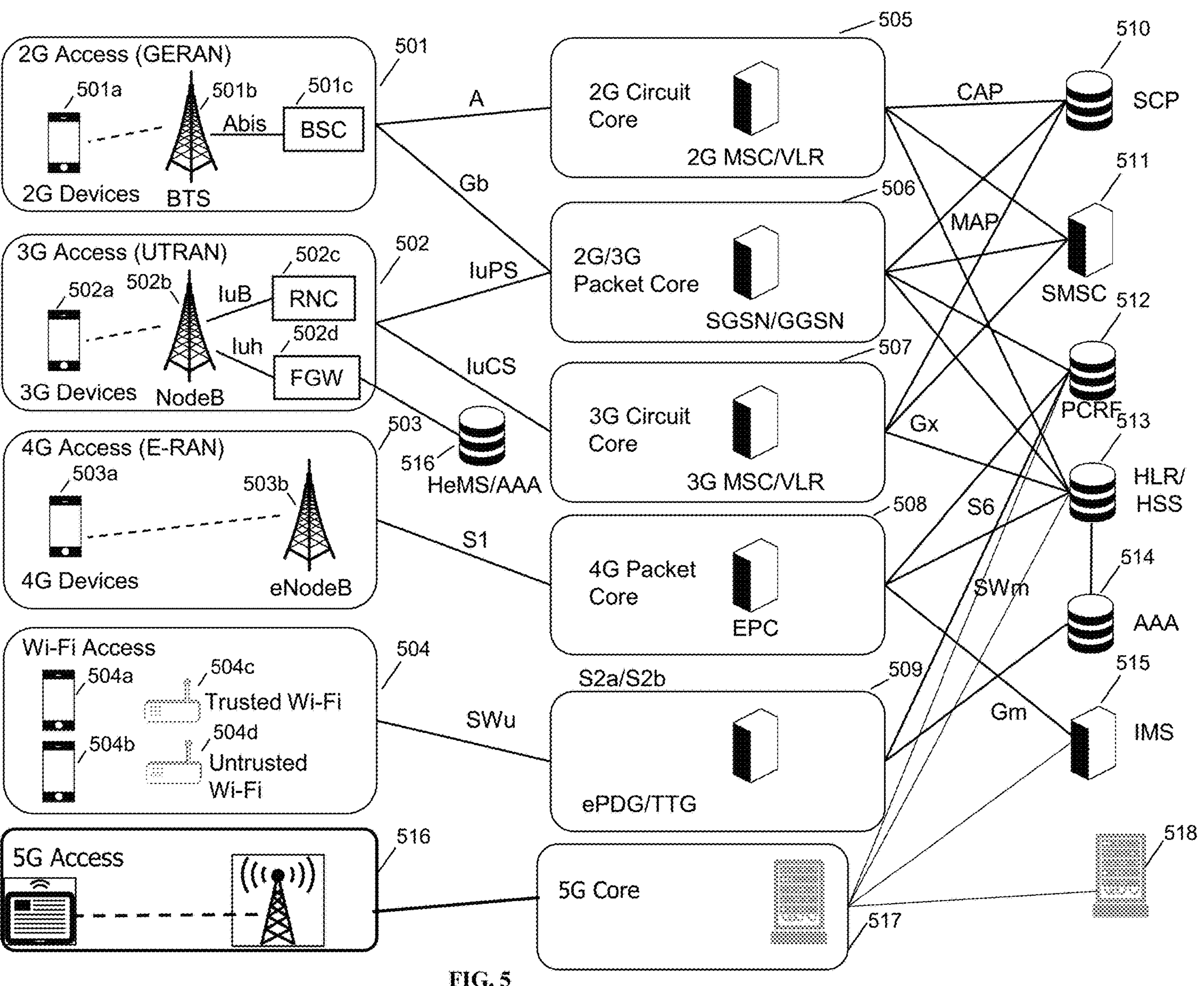
FIG. 5 is a schematic network architecture diagram for 3G and other-G prior art networks.

FIG. 5 is a schematic network architecture diagram for 3G and other-G prior art networks. The diagram shows a plurality of "Gs," including 2G, 3G, 4G, 5G and Wi-Fi. 2G is represented by GERAN 501, which includes a 2G device 501*a*, BTS 501*b*, and BSC 501*c*. 3G is represented by UTRAN 502, which includes a 3G UE 502*a*, nodeB 502*b*, RNC 502*c*, and femto gateway (FGW, which in 3GPP namespace is also known as a Home nodeB Gateway or HNBGW) 502*d*. 4G is represented by EUTRAN or E-RAN 503, which includes an LTE UE 503*a* and LTE eNodeB 503*b*. Wi-Fi is represented by Wi-Fi access network 504, which includes a trusted Wi-Fi access point 504*c* and an untrusted Wi-Fi access point 504*d*. The Wi-Fi devices 504*a* and 504*b* may access either AP 504*c* or 504*d*. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501*c* is required for Abis compatibility with BTS 501*b*, while for the 3G UTRAN, an RNC 502*c* is required for Iub compatibility and an FGW 502*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 6:
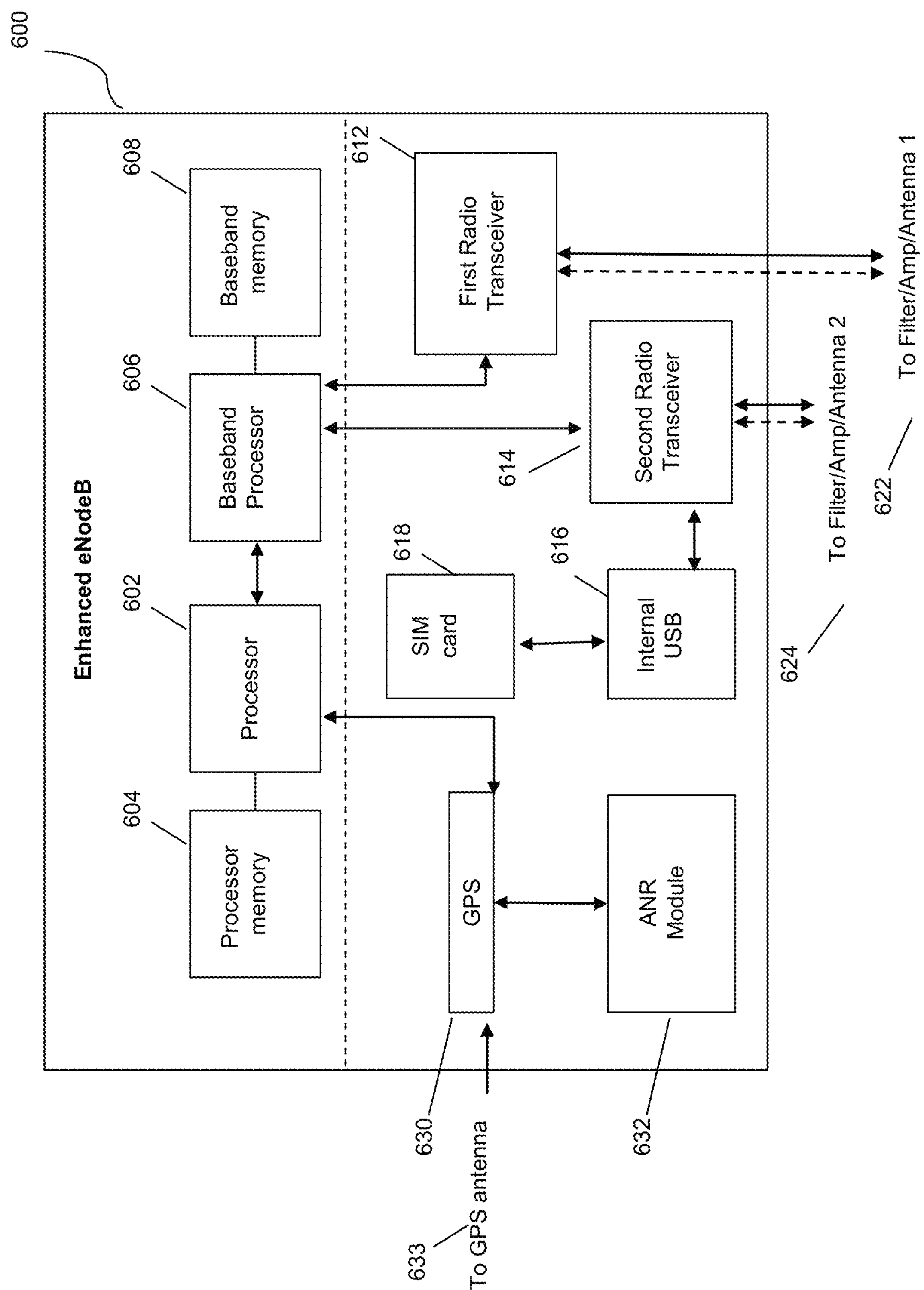
FIG. 6 is an enhanced eNodeB for performing the methods described herein, in accordance with some embodiments.

FIG. 6 is an enhanced eNodeB for performing the methods described herein, in accordance with some embodiments. Mesh network node 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
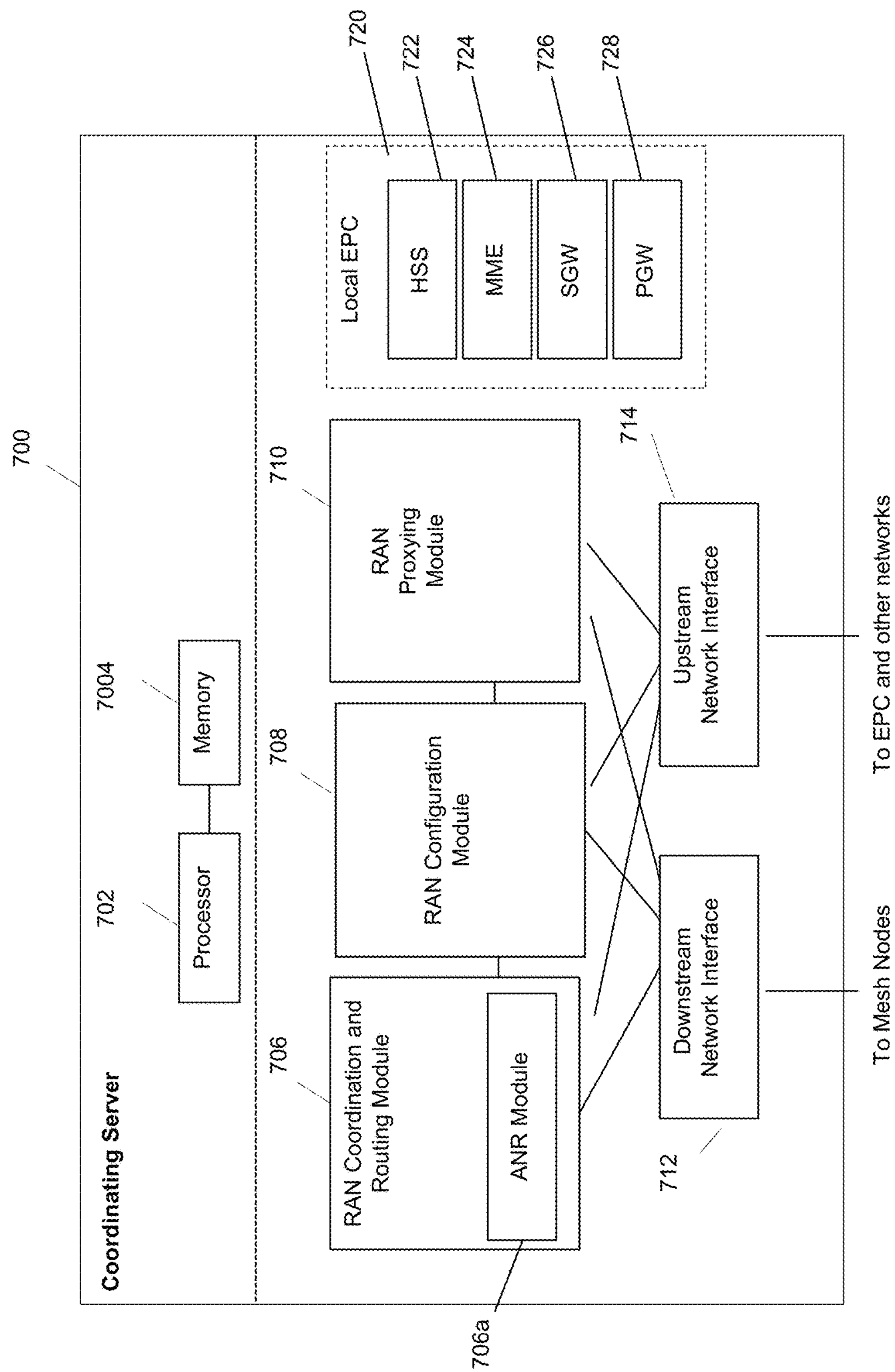
FIG. 7 is a coordinating server for providing services and performing methods as described herein, in accordance with some embodiments.

FIG. 7 is a coordinating server for providing services and performing methods as described herein, in accordance with some embodiments. Coordinating server 700 includes processor 702 and memory 704, which are configured to provide the functions described herein. Also present are radio access network coordination/routing (RAN Coordination and routing) module 706, including ANR module 706*a*, RAN configuration module 708, and RAN proxying module 710. The ANR module 706*a* may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word “cell” is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method comprising:

defining a plurality of Information Elements (IEs) relating to a retransmit timer value and a retransmit count;

including, by a Mobility Management Entity (MME), the plurality of IEs in a first network access stratum NAS message sent to an eNodeB with a timer value and a retransmission count for the NAS message;

processing, by the eNodeB, the NAS message, buffering the NAS message, and starting a corresponding timer; and sending, by the eNodeB when a response from a User Equipment (UE) pertaining to the NAS message is not received before the timer expires, a stop retry message indication to the MME.

2. The method of claim 1 wherein defining a plurality of Information Elements (IEs) relating to a retransmit timer value includes defining a retransmit timer value IE.

3. The method of claim 1 wherein defining a plurality of Information Elements (IEs) relating to a retransmit count includes defining a retransmit count value IE.

4. The method of claim 1 further comprising receiving an indication at the MME that the NAS message has been buffered successfully and that the MME does not need to retransmit the NAS message.

5. The method of claim 1 further comprising receiving an indication at the MME that retry of NAS messages will be taken care of by the eNodeB and that the MME can stop retransmissions.

6. The method of claim 1 further comprising starting a timer having a value of Tx multiplied by a retransmission count.

7. A system providing S1AP optimal retransmission comprising:

a plurality of Information Elements (IEs) relating to a retransmit timer value and a retransmit count;

a Mobility Management Entity (MME) including the plurality of IEs in a first network access stratum NAS message sent to an eNodeB with a timer value and a retransmission count for the NAS message;

wherein the eNodeB processes the NAS message, buffers the NAS message, and starts a corresponding timer; and wherein the eNodeB sends a stop retry message indication to the MME when a response from a User Equipment (UE) pertaining to the NAS message is not received before the timer expires.

8. The system of claim 7 wherein a plurality of Information Elements (IEs) relating to a retransmit timer value includes a retransmit timer value IE.

9. The system of claim 7 wherein a plurality of Information Elements (IEs) relating to a retransmit count includes a retransmit count value IE.

10. The system of claim 7 further comprising the MME receiving an indication that the NAS message has been buffered successfully and that the MME does not need to retransmit the NAS message.

11. The system of claim 7 further comprising the MME receiving an indication that retry of NAS messages will be taken care of by the eNodeB and that the MME can stop retransmissions.

12. The system of claim 7 further comprising a timer having a value of Tx multiplied by a retransmission count is started.

13. A non-transitory computer-readable medium containing instructions for operating a wireless network system which, when executed, cause the system to perform steps comprising:

defining a plurality of Information Elements (IEs) relating to a retransmit timer value and a retransmit count;

including, by a Mobility Management Entity (MME), the plurality of IEs in a first network access stratum (NAS) message sent to an eNodeB with a timer value and a retransmission count for the NAS message;

processing, by the eNodeB, the NAS message, buffering the NAS message, and starting a corresponding timer; and sending, by the eNodeB when a response from a User Equipment (UE) pertaining to the NAS message is not received before the timer expires, a stop retry message indication to the MME.

14. The computer-readable medium of claim 13 wherein instructions for defining a plurality of Information Elements (IEs) relating to a retransmit timer value includes instructions for defining a retransmit timer value IE.

15. The computer-readable medium of claim 13 wherein instructions for defining a plurality of Information Elements (IEs) relating to a retransmit count includes instructions for defining a retransmit count value IE.

16. The computer-readable medium of claim 13 further comprising instructions for receiving an indication at the MME that the NAS message has been buffered successfully and that the MME does not need to retransmit the NAS message.

17. The computer-readable medium of claim 13 further comprising instructions for receiving an indication at the MME that retry of NAS messages will be taken care of by the eNodeB and that the MME can stop retransmissions.

18. The computer-readable medium of claim 13 further comprising instructions for starting a timer having a value of Tx multiplied by a retransmission count.

* * * * *